(12) United States Patent
Suzuki et al.

(10) Patent No.: US 8,014,817 B2
(45) Date of Patent: Sep. 6, 2011

(54) WIRELESS COMMUNICATION TERMINAL AND ANTENNA SWITCHING CONTROL METHOD

(75) Inventors: Tadashige Suzuki, Kitami (JP); Kunihiko Watanabe, Kitami (JP)

(73) Assignee: Kyocera Corporation, Kyoto (JP)

( * ) Notice: Subject to any disclaimer, the term of this patent is extended or adjusted under 35 U.S.C. 154(b) by 707 days.

(21) Appl. No.: 11/119,535

(22) Filed: Apr. 29, 2005

(65) Prior Publication Data

US 2005/0245207 A1 Nov. 3, 2005

(30) Foreign Application Priority Data

Apr. 30, 2004 (JP) .................................. 2004-136491

(51) Int. Cl.
*H04M 1/00* (2006.01)
*H04W 4/00* (2009.01)
(52) U.S. Cl. ..................... 455/552.1; 370/328
(58) Field of Classification Search .................. 370/310, 370/328; 455/101, 115.1, 132, 140, 272, 455/277.1, 552.1, 553.1, 562.1, 78, 82, 88
See application file for complete search history.

(56) References Cited

U.S. PATENT DOCUMENTS

| | | | |
|---|---|---|---|
| 6,714,773 B1 * | 3/2004 | Ishida | 455/272 |
| 7,239,889 B2 * | 7/2007 | Saari et al. | 455/552.1 |
| 7,430,257 B1 * | 9/2008 | Shattil | 375/347 |
| 2003/0124982 A1 | 7/2003 | Saari et al. | |

FOREIGN PATENT DOCUMENTS

| | | |
|---|---|---|
| EP | 1124337 A2 | 8/2001 |
| JP | 05252094 A | 9/1993 |
| JP | 09116458 A | 5/1997 |
| JP | 10173578 A | 6/1998 |
| JP | 11-055166 | 2/1999 |
| JP | 2002237764 A | 8/2002 |
| JP | 2002-344560 | 11/2002 |
| JP | 2002-369247 | 12/2002 |
| JP | 2004023536 A | 1/2004 |
| JP | 2004032462 A | 1/2004 |
| KR | 1999-023276 | 3/1999 |
| WO | 0150636 A1 | 7/2001 |
| WO | 2004015813 A1 | 2/2004 |

OTHER PUBLICATIONS

Japanese language office action and its English language translation for corresponding Japanese application 2004136491 lists the references above.

* cited by examiner

*Primary Examiner* — Michael T Thier
(74) *Attorney, Agent, or Firm* — DLA Piper LLP (US)

(57) ABSTRACT

A wireless communication terminal able to change a resonance frequency of a sub antenna, able to reduce interference to a main antenna, and able to suppress deterioration performance in a dual terminal compatible with a plurality of transmission systems, wherein, in a wireless communication unit, at the time of a CDMA2000 1xEVDO mode, a first receiver circuit, a second receiver circuit, and a transmitter circuit are in an operative state, and, in the second receiver circuit, an input impedance is held at the 50 ohm input impedance of a LNA by an impedance control unit, while at the time of a CDMA2000 1x mode, the first receiver circuit and the transmitter circuit are in the operative state, the second receiver circuit is in an inoperative state, and, in the second receiver circuit, the input impedance is controlled so as to be shifted from the 50 ohm input impedance of the LNA by the impedance control unit, and an antenna switching control method for the same.

7 Claims, 6 Drawing Sheets

| MODE | MAIN PURPOSE | Rx CIRCUIT 1 | Rx CIRCUIT 2 | Tx CIRCUIT | IMPEDANCE CONTROL UNIT |
|---|---|---|---|---|---|
| EVDO | DATA TRANSFER | ○ | ○ | ○ | 50 Ω |
| 1x | VOICE COMMUNICATION | ○ | × | ○ | not 50 Ω |

BLOCK OPERATION STATE IN EACH MODE (○:OPERATIVE, ×:INOPERATIVE)

| L | C | ANTENNA RECEPTION POWER MEASUREMENT VALUE[dBm] | INTERFERENCE DEGREE BY Sub_ANT [dB] | REMARKS |
|---|---|---|---|---|
| NO PART | NO PART | −39.84 | | TERM NUMBER OPEN STATE |
| 100[pF] | 2[pF] | −41.01 | −1.25 | 100[pF] MEANS HIGH FREQUENCY LIKE SHORT-CIRCUITING |
| 100[pF] | 5[pF] | −40.09 | −2.42 | |
| 100[pF] | 10[pF] | −39.36 | −1.5 | |
| 100[pF] | 100[pF] | −38.81 | −0.77 | |
| 1.5[nH] | 100[pF] | −38.65 | −0.22 | |
| 2.7[nH] | 100[pF] | −38.71 | −0.06 | |
| 3.9[nH] | 100[pF] | −38.59 | −0.12 | |
| 4.7[nH] | 100[pF] | −38.59 | 0 | |
| 5.6[nH] | 100[pF] | −38.67 | 0 | |
| 6.8[nH] | 100[pF] | −38.64 | −0.08 | |
| 8.2[nH] | 100[pF] | −38.77 | −0.05 | |
| | | | −0.18 | |

WIRELESS COMMUNICATION TERMINAL AND ANTENNA SWITCHING CONTROL METHOD

BACKGROUND OF THE INVENTION

1. Field of the Invention

The present invention relates to a mobile phone or other wireless communication terminal able to utilize a plurality of wireless networks and to an antenna switching method. In more detail, the present invention relates to a wireless communication terminal able to communicate by a transmission system without use of diversity (for example CDMA2000 1x) and a transmission system with use of diversity (for example CDMA2000 1xEVDO) and having receiver circuits with frequency bands where these frequency bands interfere with each other and to an antenna switching control method for the same.

2. Description of the Related Art

In recent years, mobile phones and other wireless communication terminals able to utilize a plurality of wireless networks have come into use. These types of wireless communication terminals are configured so that communication quality information such as communication speed can be displayed.

Further, as a high speed wireless communication system, the CDMA2000 1xEVDO (EVolution Data Only) system is now coming into use.

The communication quality information of the currently used CDMA2000 1x transmission system does not change much in data transfer speed according to location, therefore the state of reception etc. is determined on the basis of an instantaneous value such as the ratio of the pilot signal strength to the total reception signal strength (Ec/Io) found from the pilot signal received from a base station and a carrier-to-interference ratio (CIR).

On the other hand, the communication quality information of the CDMA2000 1xEVDO transmission system is the average of the data transfer speed (DRC: Data Rate Control Bit) predicted on the wireless communication terminal side on a basis of the reception state (received field strength, C/I (Carrier to Interference), etc.). This is displayed on a display portion and notified to the user (see for example Japanese Unexamined Patent Publication (Kokai) No. 2002-369247 and Japanese Unexamined Patent Publication (Kokai) No. 2002-344560).

Due to this, the user of a wireless communication terminal employing the CDMA2000 1xEVDO system can obtain a correct grasp of the communication state.

A wireless communication terminal employing this CDMA2000 1xEVDO system assumes use under a strong field. The antenna gain is therefore not viewed as that important.

In order to improve the reception performance, the wireless communication terminal is configured so as to communicate by a diversity method using a plurality of antennas and receiver circuits so that the performance is obtained even under a fading environment. A mobile device can be configured even by one receiver circuit, but a better performance is obtained by two or more receiver circuits.

In a wireless communication terminal employing the CDMA2000 1xEVDO system, specifically an RF front end is configured by a transmitter/receiver circuit for the main antenna and a dedicated receiver circuit for the sub antenna in combination.

The signals obtained from the plurality of receiver circuits are combined by the maximum ratio combining method or the minimum mean square error method to compensate for deterioration of the reception performance in a fading environment.

In general, comparing the reception state in a case of using one antenna (not using a diversity method) and the reception state in a case of using two antennas (using a diversity method), it is learned that the influence due to interference is extremely small in the case of using two antennas (using a diversity method) compared with the case of using one antenna (not using a diversity method).

On the other hand, a wireless communication terminal used in the CDMA2000 1x transmission system assumes wide area service and desirably can be used in an environment with a weak field. Further, it is configured by a single receiver circuit. Accordingly, one antenna, that is, the main antenna, is employed.

If simply configuring a dual mode terminal compatible with both the CDMA2000 1xEVDO system and CDMA2000 1x system along with the spread of use of the CDMA2000 1xEVDO system, there are the following disadvantages.

As explained above, the properties of a terminal required under the CDMA2000 1xEVDO system and CDMA2000 1x system differ. Further, the frequency bands used in the two systems are the same or close.

Accordingly, if designing a dual mode terminal compatible with both systems, there is possibility that the performance will end up being inferior to that of a terminal designed for each individual system.

For example, if making a terminal of the CDMA2000 1xEVDO system compatible with the CDMA2000 1x system, the problem of interference between the main antenna and the sub antenna will lower the antenna performance. As a result, the area in which the terminal can be used in the CDMA2000 1x mode will become narrower.

SUMMARY OF THE INVENTION

An object of the present invention is to provide a wireless communication terminal able to change the resonance frequency of its sub antenna, able to reduce the interference to the main antenna, and able to suppress the deterioration in performance at a dual terminal made compatible with a plurality of transmission systems and to provide an antenna switching control method for the same.

According to a first aspect of the present invention, there is provided a wireless communication terminal able to selectively communicate by a first transmission system without use of a diversity method and a second transmission system with use of a diversity method and having a reception function of a frequency band where the frequency bands of the transmission systems interfere with each other, comprising a main antenna, a sub antenna, and a signal processing unit, wherein the signal processing unit communicates by only the main antenna when the first transmission system is used for communication, combines the signals received by the main antenna and sub antenna when the second transmission system is used for communication, makes an impedance from a reception unit to the sub antenna a first impedance able to be matched with in the frequency band used when the second transmission system is used for communication, and changes the impedance to a value different from the first impedance when the first transmission system is used for communication.

Preferably, the wireless communication terminal is further provided with a transmission unit for transmission by the first transmission system between the main antenna and the signal processing unit.

Preferably, the wireless communication terminal is further provided with a switch between the sub antenna and the reception unit, and the signal processing unit separates the sub antenna from the reception unit by the switch when the first transmission system is used for communication.

Preferably, the signal processing unit changes the impedance of the sub antenna to a value different from the first impedance even in a standby state.

Preferably, the signal processing unit specifies a reception slot or a non-reception slot of its own terminal at the time of reception along with the second transmission system by communication with the base station, and, even during communication by the second transmission system, changes the impedance of the sub antenna to a value different from the first impedance in a non-reception slot.

According to a second aspect of the present invention, there is provided an antenna switching control method of a wireless communication terminal having a main antenna and a sub antenna, able to selectively communicate by a first transmission system without use of a diversity method and a second transmission system with use of a diversity method, and having a reception function of a frequency band where the frequency bands in the transmission systems interfere with each other, comprising the steps of communicating by only the main antenna when the first transmission system is used for communication; combining signals received by the main antenna and sub antenna when the second transmission system is used for communication; making an impedance from a receiving means to the sub antenna a first impedance able to be matched with in a frequency band used when the second transmission system is used for communication, and changing the impedance to a value different from the first impedance when the first transmission system is used for communication.

BRIEF DESCRIPTION OF THE DRAWINGS

These and other objects and features of the present invention will become clearer from the following description of the preferred embodiments given with reference to the accompanying drawings, wherein.

DESCRIPTION OF THE PREFERRED EMBODIMENTS

Below, embodiments of the present invention will be explained with reference to the accompanying drawings.

Figure 1:
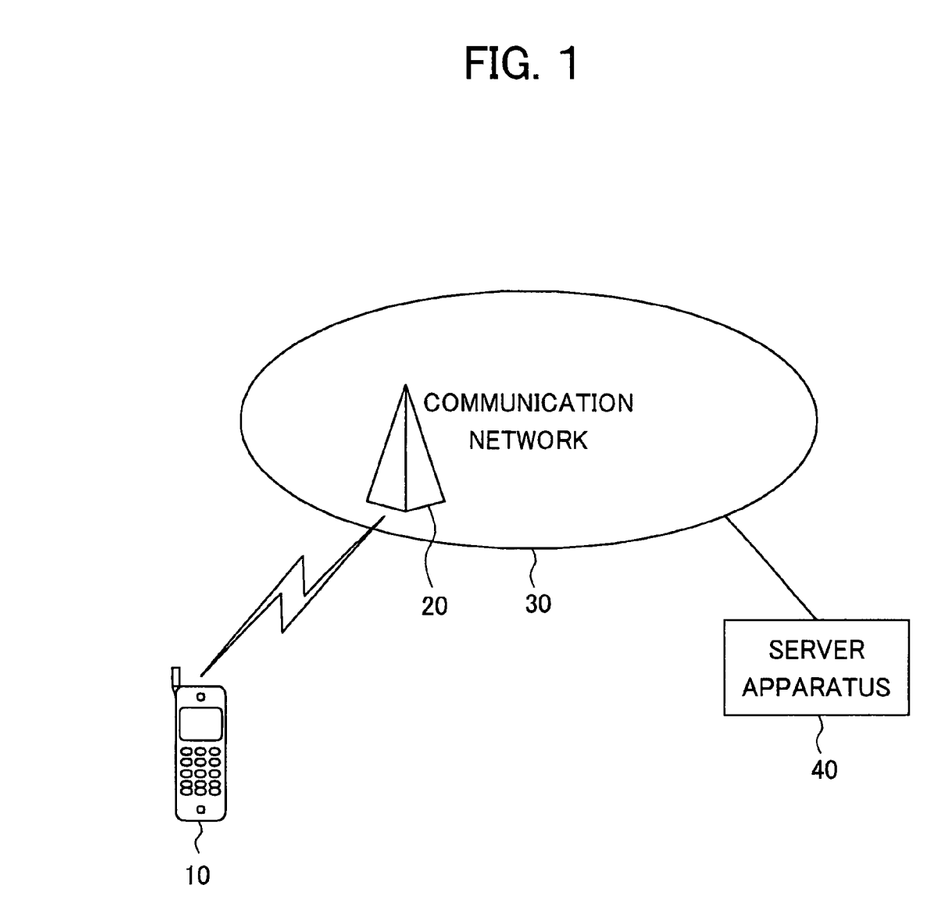
FIG. 1 is a view of the configuration of a wireless communication system to which a mobile phone embodying a wireless communication terminal according to an embodiment of the present invention is applied.

FIG. 1 is a view of the system configuration of a wireless communication system to which a mobile phone embodying a wireless communication terminal according to an embodiment of the present invention is applied.

A mobile phone 10 according to the present embodiment has, as shown in FIG. 1, a function of requesting desired data from a server apparatus 40 via a communication network 30 through a base station 20 by a wireless communication unit and displaying Web data etc. in response to the request on a display portion.

The mobile phone 10 according to the present embodiment has a main antenna, a sub antenna, and a reception system circuit, is able to selectively communicate by a first transmission system without use of a diversity method (CDMA2000 1x, hereinafter simply referred to as the "1x system"), and a second transmission system with use of a diversity method (CDMA2000 1xEVDO system, hereinafter simply referred to as the "EVDO system"), and in addition has a reception function of a frequency band where the frequency bands of the transmission systems interfere with each other. Note that part of the transmission system circuit and the reception system circuit is shared by the first and second transmission systems.

The reception system circuit communicates by only the main antenna when the 1x system is used for communication, while combines signals received at the main antenna and the sub antenna when the EVDO system is used for communication. Further, it makes the impedance from the reception unit with respect to the sub antenna a first impedance (for example 50 ohms) able to be matched with in the frequency band used when the EVDO system is used for communication.

The reception system circuit changes the impedance to a value different from the first impedance when the 1x system is used for communication. For example, it opens or short-circuits the input impedance to change to a frequency different from that of the main antenna.

Namely, in the present embodiment, assume that the mobile phone 10 is configured as a wireless communication terminal which can be connected to wireless networks (communication networks) of the following two types of transmission systems:

(1) A normally connected network of the 1x system (IS95)

(2) A network of the EVDO system wherein the communication speed is faster than that of the normally connected wireless network (1) but the service area is narrower.

In the EVDO system, by switching the modulation method of the data which the base station 20 transmits to this wireless communication terminal on the basis of the information of the reception state received from the wireless communication terminal, it becomes possible to use a high communication speed having a low error tolerance when the reception state of this terminal is good and use a low communication speed having a high error tolerance when the reception state is bad.

Further, in the downlink direction of the EVDO system (direction from the base station to the wireless communication terminal), time is divided into units of 1/600 second. In each unit of time, only one wireless communication terminal is communicated with. By switching the wireless communication terminals communicated with according to the time, it becomes possible to communicate with a plurality of mobile communication terminals in a time division multiplex access (TDMA) system. Due to this, it becomes possible to transmit data by the maximum power to the individual wireless communication terminals at all times and becomes possible to transfer data between mobile communication terminals at the fastest communication speed.

Figure 2:
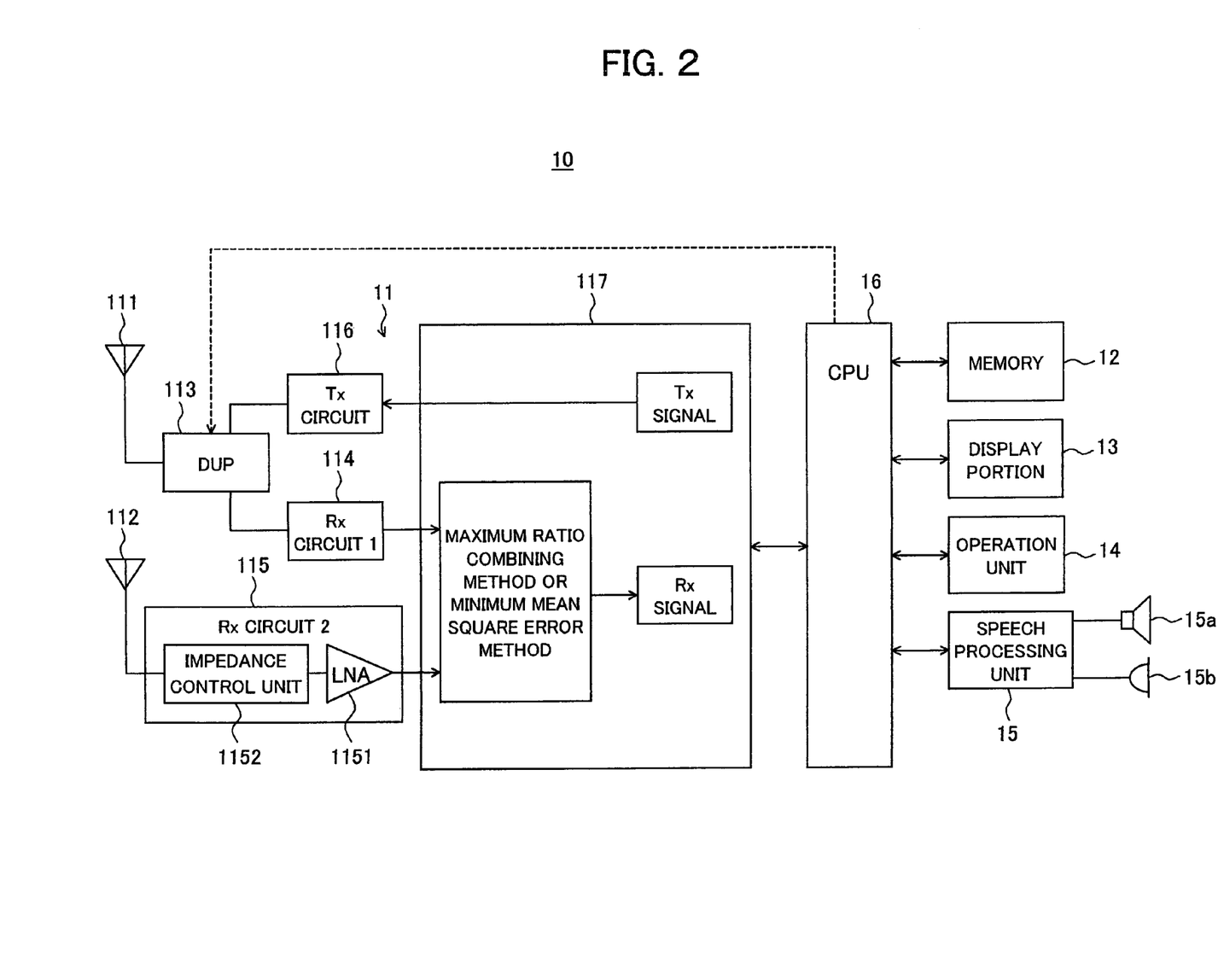
FIG. 2 is a block configuration diagram of a mobile phone embodying a wireless communication terminal according to an embodiment of the present invention.

FIG. 2 is a block diagram of a mobile phone 10 embodying a wireless communication terminal according to an embodiment of the present invention.

The mobile phone 10 according to the present embodiment has, as shown in FIG. 2, a wireless communication unit 11, a memory 12 as a storage portion, a display portion 13, an operation unit 14, a voice processing unit 15 including a speaker 15a and a microphone 15b, and a control unit (CPU) 16.

The wireless communication unit 11 modulates various information such as image data, voice information, and e-mail processed at the control unit 16 and transmits the same through the transmission/reception antenna to the communication network 30 including the base station 20 for wireless communication utilizing radio waves.

Further, the wireless communication unit 11 receives image data, speech information, e-mail etc. transmitted from the server apparatus 40 via the communication network 30 and the base station 20 through the transmission/reception antenna, demodulates the received various information, and outputs the results to the control unit 16.

The wireless communication unit 11 has, for example as shown in FIG. 2, a main antenna 111, a sub antenna 112, a switch (DUP) 113, a first receiver circuit 114, a second receiver circuit 115, a transmitter circuit 116, and a baseband unit 117.

The switch 113 switches the connection between the main antenna 111 and the first receiver circuit 114 or the transmitter circuit 116 by a switching control signal of the control unit 16.

The first receiver circuit 114 includes a low noise amplifier (LNA) or a common unit or demodulator etc. and demodulates a pilot signal of the 1x transmission system or the EVDO system received at the main antenna 111 from the base station 20 via the switch 113 from a reception signal of the baseband region to a multiplexed signal by a demodulation method corresponding to the modulation method of the reception signal received from the base station 20. Note that, in the present embodiment, the demodulation is carried out by one of the three types of demodulation methods of for example QPSK (Quadrature Phase Shift Keying), 8PSK (8 Phase Shift Keying), and 16QAM (16 Quadrature Phase Amplitude Modulation).

The second reception circuit 115 demodulates the pilot signal of the EVDO system received basically by the sub antenna 112 from the reception signal of the baseband width to a multiplexed signal by a demodulation method corresponding to the modulation method of the reception signal received from the base station 20. Note that in the present embodiment, the demodulation is carried out by one of the three types of demodulation methods of for example QPSK, 8PSK, and 16QAM.

The second receiver circuit 115 makes its input impedance 50 ohms under the EVDO transmission system and matches the corresponding frequency of the sub antenna 112 with the reception band.

The second receiver circuit 115 opens the input impedance or shifts the same to the short-circuiting direction under the 1x transmission system and to change it to a frequency band different from that of the main antenna 111.

Under the EVDO transmission system, that is, the EVDO mode, the diversity configuration enables the tolerance under a fading environment to be improved. This leads to an improvement of the reception performance.

Conversely, under the 1x transmission system, that is, the 1x mode, no second receiver circuit 115 is necessary. In addition, the sub antenna 112 connected to the second receiver circuit 115 interferes with and has an adverse effect on the main antenna 111.

The second receiver circuit 115 includes a LNA 1151 and an impedance control unit 1152 arranged in front of the LNA 1151 and reduces the interference at the time of the 1x mode by the impedance control unit 1152.

In the present embodiment, the interference at the time of the 1x mode is reduced by using the input impedance of the LNA 1151 in the second receiver circuit 115.

At the time of operation, usually the input impedance of the LNA 1151 is 50 ohms. At the time of the 1x mode, this is inoperative, but the input impedance at that time is shifted from 50 ohms.

The transmitter circuit 116 transmits the information to be transmitted supplied from the baseband unit 117 via the switch 113 through the main antenna 111 to the communication network 30 including the base station 20.

The baseband unit 117 receives as input the reception data demodulated at the first receiver circuit 114 and the second receiver circuit 115 under the EVDO transmission system and performs decoding processing by a not illustrated decoder, specifically, despread spectrum processing for a spread spectrum received multiplexed signal. The baseband unit 117 combines the signals obtained from the first and second receiver circuits 114 and 115 by the maximum ratio combining method and the minimum mean square error method, to compensate for the deterioration of the reception performance in a fading environment.

Here, when there is the reception data assigned to itself (for example a speech signal from the other party in communication or data desired to be downloaded), the reception data is output from the decoder to the control unit 16.

Further, in the process of the decoding processing, the decoder finds the Ec/Io and calculates the CIR on the basis of the following Equation (1):

$$CIR=(Ec/Io)(1-Ec/Io) \tag{1}$$

The CIR found on a basis of the above equation is output from the decoder to a not illustrated prediction unit. The prediction unit predicts the value of the CIR at the next reception slot timing (here, 1 slot is 1.66 ms=1/600 second).

The method of the prediction here is not particularly limited, but a method such as linear prediction can be mentioned as an example. Further, the information indicating after how many slots the prediction unit is to predict the CIR is included in various control signals transmitted from the base station 20 when the mobile phone 10 is powered up. The predicted CIR found by the prediction unit is supplied to a not illustrated CIR-DRC conversion unit.

The CIR-DRC conversion unit converts the predicted CIR to a DRC based on a not illustrated CIR-DRC conversion table. This DRC indicates the highest communication speed possible for reception with less than a predetermined error rate in a mobile phone 10 as expected from the predicted CIR. Here, in the CIR-DRC conversion table, DRC's corresponding to reference CIR's are defined. When the predicted CIR which is input is a reference CIR, the CIR-DRC conversion unit outputs the DRC corresponding to the CIR to the control unit 16.

On the other hand, when the predicted CIR input from the prediction unit is not a reference CIR, the DRC corresponding to the reference CIR closest to the input predicted CIR is acquired or the two CIR's closest to the input predicted CIR are interpolated to acquire the DRC. By this, a DRC in accordance with each predicted CIR can be acquired, and it becomes possible to notify the user of a more correct reception state.

The baseband unit 117 multiplexes the DRC and the transmission data output from the control unit 16 by a multiplexer, encodes the result by the encoder, and outputs it to the transmitter circuit 116.

The baseband unit 117 receives as input the demodulated reception data at the first receiver circuit 114 under the 1x transmission system and performs decoding processing by a not illustrated decoder, specifically performs despread spectrum processing on a spread spectrum received multiplexed signal.

Here, when there is reception data assigned to itself (for example speech signal from the other party in communication or data desired to be downloaded), the reception data is output from the decoder to the control unit 16.

Further, in the process of the decoding processing, the decoder finds the Ec/Io, calculates the CIR on the basis of the above Equation (1), and outputs the result to the control unit 16.

The baseband unit 117 multiplexes the transmission data output from the control unit 16 by the multiplexer, encodes the result by the encoder, and outputs it to the transmitter circuit 116.

Figure 3:
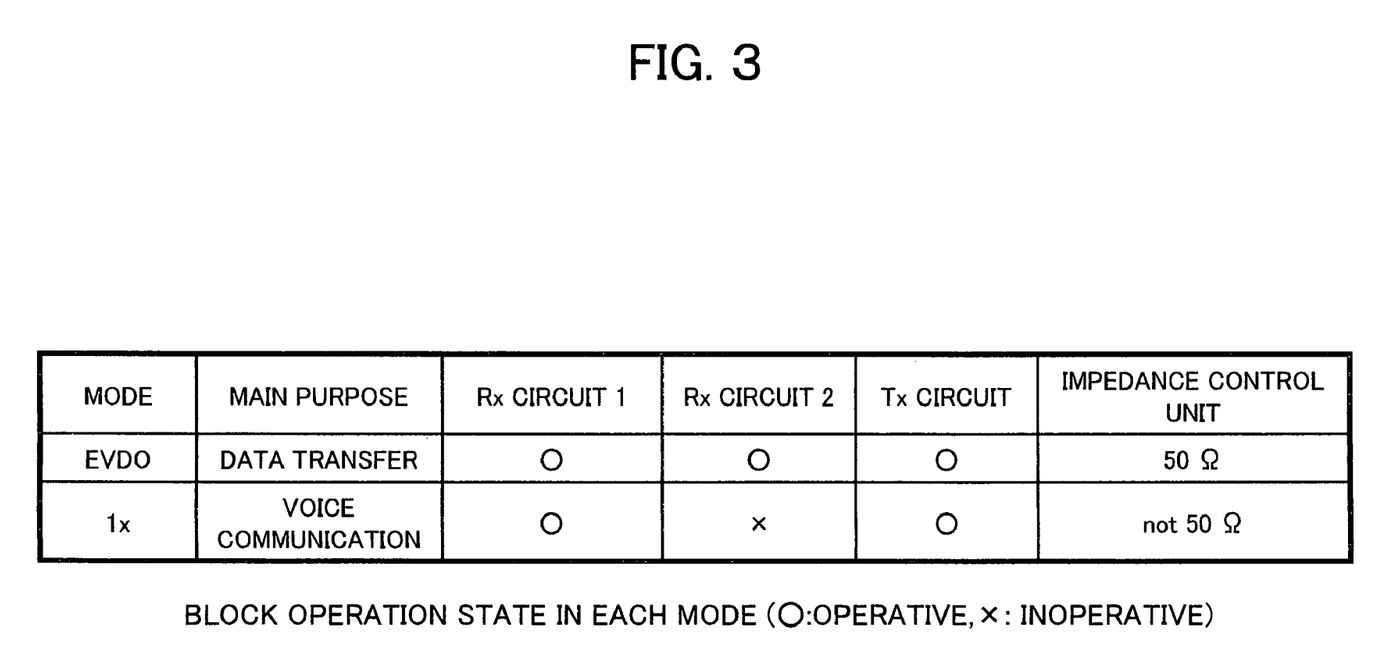
FIG. 3 is a table showing operation states of each circuit at the time of a CDMA2000 1xEVDO mode and a time of a CDMA2000 1x mode of a wireless communication terminal according to an embodiment of the present invention.

FIG. 3 is a table showing the operation states of the different circuits at the time of the EVDO mode and the time of the 1x mode in the wireless communication unit 11.

As shown in FIG. 3, at the time of the EVDO mode mainly used for data transfer, in the wireless communication unit 11, the first receiver circuit 114, the second receiver circuit 115, and the transmitter circuit 116 are in the operative state, and the second receiver circuit 115 holds the input impedance at the 50 ohm input impedance of the LNA 1151 by the impedance control unit 1152.

In the wireless communication unit 11, at the time of the 1x mode mainly used for speech communication, the first receiver circuit 114 and the transmitter circuit 116 are in the operative state, the second receiver circuit 115 is in the inoperative state, and, in the second receiver circuit 115, the input impedance is shifted from the 50 ohm input impedance of the LNA 1151 by the impedance control unit 1152.

The memory 12 includes a nonvolatile memory such as an EEPROM and previously stores a desired communication speed for every communication system in for example a speed display table.

The display portion 13 has a liquid crystal display (LCD) or organic electroluminescent (EL) display and displays telephone numbers input for the speech function, various messages, text data, etc. under the control of the control unit 16.

Further, the display portion 13 displays a cursor (frame or arrow) for instructing update of the screen (request of next page, search start button, etc.) by a plurality of display formats when displaying a web page etc. on the display portion under the control of the control unit 16.

The operation unit 14 has an end (hang up)/power key, start (call) key, a plurality of ten keys corresponding to numerals, etc. These keys are operated to supply the input information from the user to the control unit 16.

The voice processing unit 15 has a voice processing circuit. The speaker 15a for voice output for the speech function and the microphone 15b for voice input for the speech function are connected to this.

The voice processing unit 15 performs predetermined processing with respect to the voice picked up by the microphone 15b in the wireless communication mode and outputs the result to the control unit 16.

The voice processing unit 15 performs predetermined processing with respect to the voice information supplied from the control unit 16 and emits the voice from the speaker 15a.

The control unit 16 is mainly configured by a microcomputer and performs overall control of the mobile phone 10.

For example, the control unit 16 controls the wireless transmission and reception of various information in the wireless communication unit 11, the processing of the speech in the voice processing unit 15, the display of information at the display portion 13, the change of the display format of the cursor, the display lighting, processing in accordance with the input information of the operation unit 14, access to the memory 12, etc.

The control unit 16 makes the display portion 13 display a standard screen immediately after the power is turned on (so-called "standby screen") according to the desired communication system through the wireless communication unit 11 in the wireless communication mode where wireless communication. In the wireless communication mode, it is possible to perform the call operation etc. by the operation of the operation unit 14.

When the DRC is input from the baseband unit 117 of the wireless communication unit 11, the control unit 16 decides whether or not there is transmission data generated in the mobile phone 10. When there is transmission data, the control unit 16 outputs this transmission data to the baseband unit 117 together with the DRC mentioned above. On the other hand, when there is no transmission data, the control unit 16 outputs the DRC input from the CIR-DRC conversion unit to the baseband unit 117.

Note that, the DRC and the transmission data output from the control unit 16 are transmitted to the base station 20 through the wireless communication unit 11. The base station 20 determines for which mobile communication terminal's transmission the next slot is used and the communication speed (modulation speed) in that transmission on the basis of the DRC received from the mobile phone 10 in the case of the EVDO system.

Note that, in the case of the 1x system, it is also possible to determine the data transfer speed in the direction from the base station 20 to the mobile phone 10 embodying the wireless communication terminal by the value at the instant of the CIR indicating the reception state at the mobile communication terminal.

Namely, in the CDMA, the current prevalent communication system, the change of the data transfer speed according to the location is not so great as in the EVDO system, therefore the necessity of quickly notifying the user of the reception state etc. is low. Further, this reception state etc. is determined based on an instantaneous value such as the Ec/Io found from the pilot signal received from the base station 20 and CIR to determine the downlink communication speed.

The control unit 16 predicts and determines the downlink data transfer speed based on the reception state of the signal from the base station 20 as mentioned above in the case of the EVDO transmission system for the following reason.

The EVDO transmission system has as its feature a large change in the data transfer speed in the direction from the base station 20 to the mobile phone 10 embodying the wireless communication terminal according to the reception state at the mobile phone 10 (for example the received field strength or CIR).

For example, when the mobile phone 10 enjoys the best reception state, data transfer at a communication speed of 2.4 Mbps becomes possible, but when the reception state is bad, the data transfer speed is lowered to several tens of kbps.

Namely, in the EVDO transmission system, the downlink data transfer speed is not simply determined by the instantaneous value of the CIR indicating the reception state as in the 1x transmission system, but changes according to correction etc. by prediction and statistical data such as the error rate of the downlink data transmission in the past.

In this way, in the EVDO transmission system, there is a remarkable change of the data transfer speed according to the location. Therefore, it is necessary to quickly notify the user of the correct data transfer speed.

For such reason, in the present embodiment, the user is notified of the DRC directly indicating the extremely correct data transfer speed found considering the correction etc. according to prediction and statistical data such as error rate of the downlink data transmission in the past. Due to this, the user can obtain a grasp of the correct data transfer speed, easily find a location suitable for the data transfer at the time of the start of the data transfer, and can start the data transfer in an environment suitable for the transfer. Note that the above DRC is a value derived from the predicted CIR, so this derived DRC is a future value (for example after 1/600 second).

Here, an explanation will be given of the operation of the circuit of FIG. 2.

At the time of the EVDO mode, in the wireless communication unit 11, the first receiver circuit 114, the second receiver circuit 115, and the transmitter circuit 116 become the operative state. In the second receiver circuit 115, the impedance control unit 1152 holds the input impedance at the input impedance of the LNA 1151, i.e., 50 ohm.

By this, a diversity configuration is exhibited, and the reception data of the main antenna 111 and the sub antenna 112 are used.

The first receiver circuit 114 demodulates the pilot signal of the EVDO system received at the main antenna 111 from the base station 20 via the switch 113 from the reception signal of the baseband width to a multiplexed signal by a demodulation method corresponding to the modulation method of the signal received from the base station 20 and outputs it to the baseband unit 117.

The second receiver circuit 115 demodulates the pilot signal of the EVDO system received by the sub antenna 112 from a reception signal of the baseband width to a multiplexed signal by a demodulation method corresponding to the modulation method of the signal received from the base station 20 and outputs it to the baseband unit 117.

The baseband unit 117 receives as input the reception data demodulated at the first receiver circuit 114 and the second receiver circuit 115 embodying the signal processing unit and performs despread spectrum processing on the spread spectrum received multiplexed signal. The baseband unit 117 combines the signals obtained from the first and second receiver circuits 114 and 115 by the maximum ratio combining method and the minimum mean square error method to compensate for the deterioration of the reception performance in a fading environment.

Here, for example, when there is the reception data assigned to itself (for example, a speech signal from the other party in communication or data desired to be downloaded), the reception data is output from the decoder to the control unit 16.

Further, the baseband unit 117 is a signal processing unit which multiplexes the DRC and the transmission data output from the control unit 16 by a multiplexer, encodes the result by an encoder, and outputs it to the transmitter circuit 116.

At the time of the 1x mode, in the wireless communication unit 11, the first receiver circuit 114, and the transmitter circuit 116 become the operative state, and the second receiver circuit 115 becomes the inoperative state.

The second receiver circuit 115 shifts the input impedance from the 50 ohm input impedance of the LNA 1151 by the impedance control unit 1152.

The first receiver circuit 114 demodulates the pilot signal of the 1x system received by the main antenna 111 from the base station 20 via the switch 113 from the reception signal of the baseband width to a multiplexed signal according to the demodulation method corresponding to the modulation method of the reception signal received from the base station 20 and outputs it to the baseband unit 117.

The baseband unit 117 receives as input the reception data demodulated at the first receiver circuit 114 under the 1x transmission system and performs despread spectrum processing on the spread spectrum received multiplexed signal.

Here, when there is reception data assigned to the itself (for example a speech signal from the other party in communication or data desired to be downloaded), the reception data is output from the decoder to the control unit 16.

Further, the baseband unit 117 multiplexes the transmission data output from the control unit 16 by the multiplexer, encodes the result by the encoder, and outputs it to the transmitter circuit 116.

As explained above, according to the present embodiment, at the time of the EVDO mode mainly used for data transfer, in the wireless communication unit 11, the first receiver circuit 114, the second receiver circuit 115, and the transmitter circuit 116 are in the operative state, and in the second receiver circuit 115, the input impedance is held at the 50 ohm input impedance of the LNA 1151 by the impedance control unit 1152, while at the time of the 1x mode mainly used for speech communication, the first receiver circuit 114 and the transmitter circuit 116 are in the operative state, the second receiver circuit 115 is in the inoperative state, and in the second receiver circuit 115, the input impedance is shifted from the 50 ohm input impedance of the LNA 1152 by the impedance control unit 1152. Therefore, the resonance frequency of the sub antenna can be changed, and a high RF performance dual terminal can be configured.

The mobile phone compatible with the different EVDO and 1x systems can be fit in a small case. In addition, the deterioration of the RF performance occurring due to the dual terminal configuration is extremely small.

Figure 4:
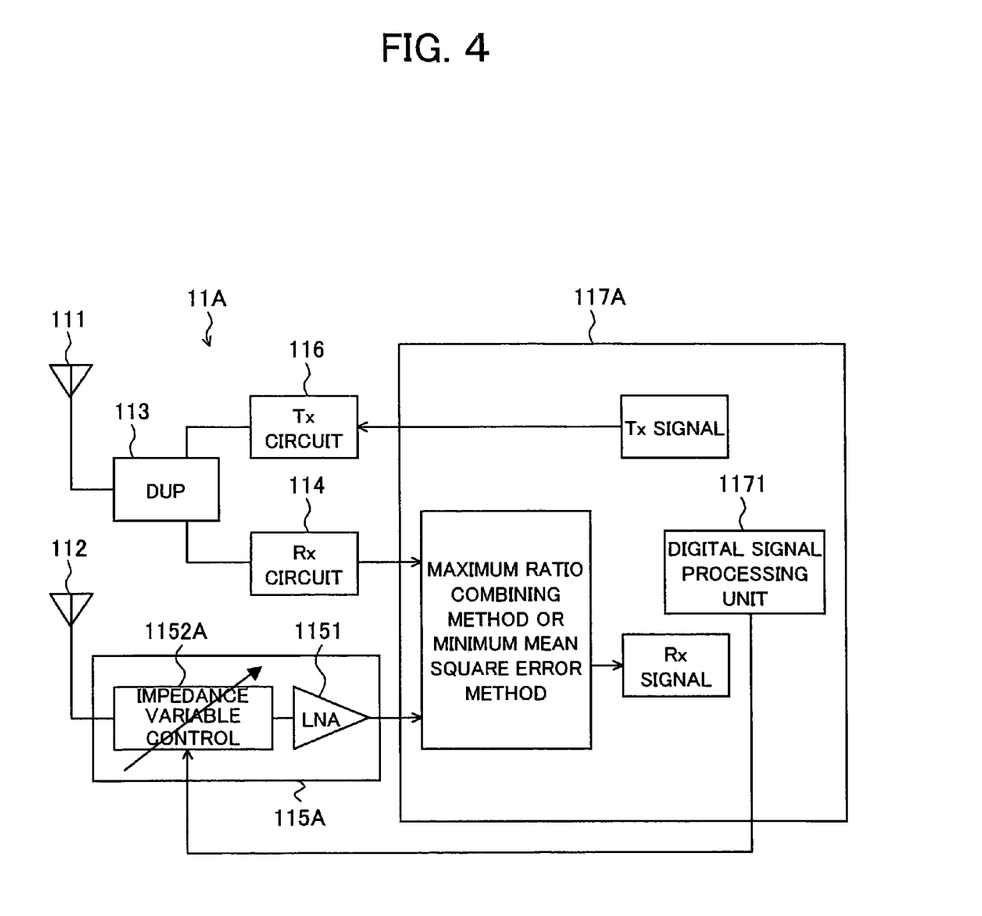
FIG. 4 and FIG. 5 are block diagrams for explaining a mobile phone embodying a wireless communication terminal according to another embodiment of the present invention is applied.
Figure 5:
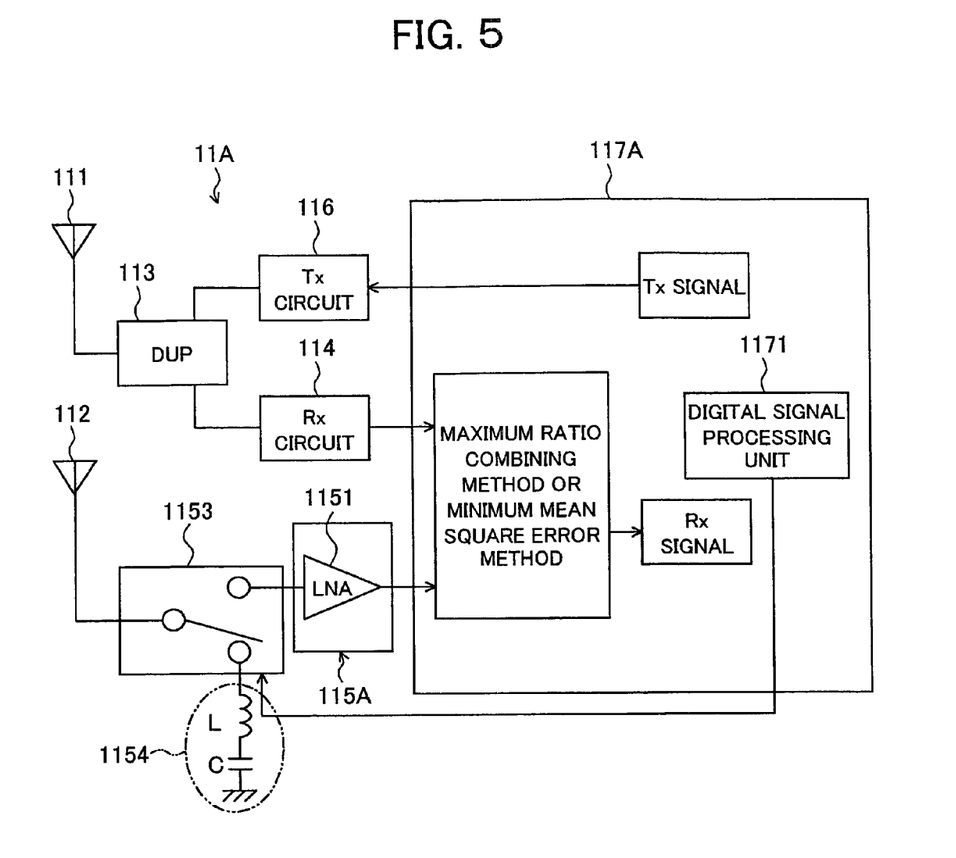

FIG. 4 and FIG. 5 are block diagrams for explaining a mobile phone embodying a wireless communication terminal according to another embodiment of the present invention.

The difference of the embodiment of FIG. 4 from the embodiment of FIG. 2 resides in the fact that the input impedance is changed by a switch or other switching circuit 1153 in a second receiver circuit 115A of a wireless communication unit 11A. Due to this, the resonance frequency of the sub antenna is changed at the time of the 1x mode.

Specifically, the switching signal indicating the mode sent from a digital signal processing unit 1171 of a baseband unit 117A determines whether to connect to a term circuit 1154 comprising a serial circuit of an inductor L and a capacitor C or connect to an LNA 1151 as shown in FIG. 5.

At the time of the diversity mode, that is the EVDO mode, the sub antenna 112 is connected to the LNA 1151, while at the time of the non-diversity mode, that is, the 1x mode, the sub antenna 112 is connected to the term circuit 1154.

In the baseband unit 117A, the digital signal processing unit 1171 monitors the received field strength (strength of the field obtained from the base station) and the CIR (representing the difference between the intended wave and an interference wave and effectively used mainly for determining the reception performance of the EVDO) all the time.

If controlling the impedance while monitoring these values, tuning to the optimal point is possible.

In this embodiment as well, the resonance frequency of the sub antenna can be changed, and a high RF performance dual terminal can be configured. Further, the mobile phone compatible with the different EVDO and 1x systems can be fit in a small case. In addition, the deterioration of the RF performance occurring due to the dual terminal configuration is extremely small.

Figure 6:
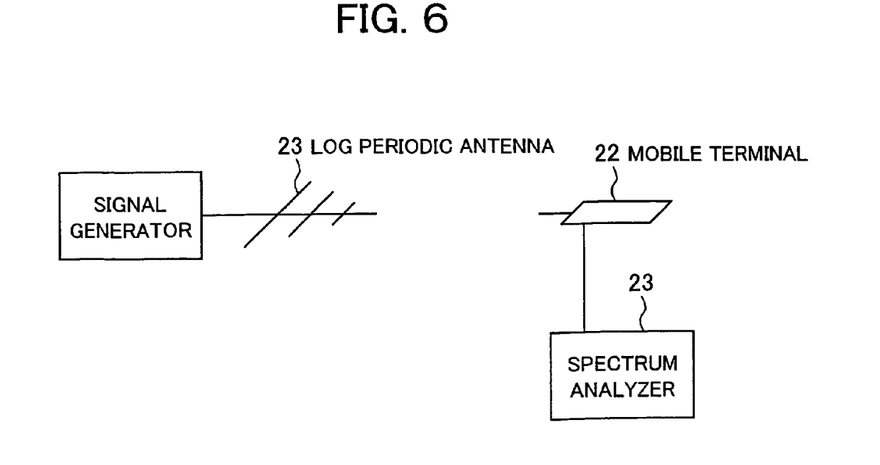
FIG. 6 is a diagram showing a measurement system for confirming changes in characteristic data of a main antenna according to a term constant.
Figure 7:
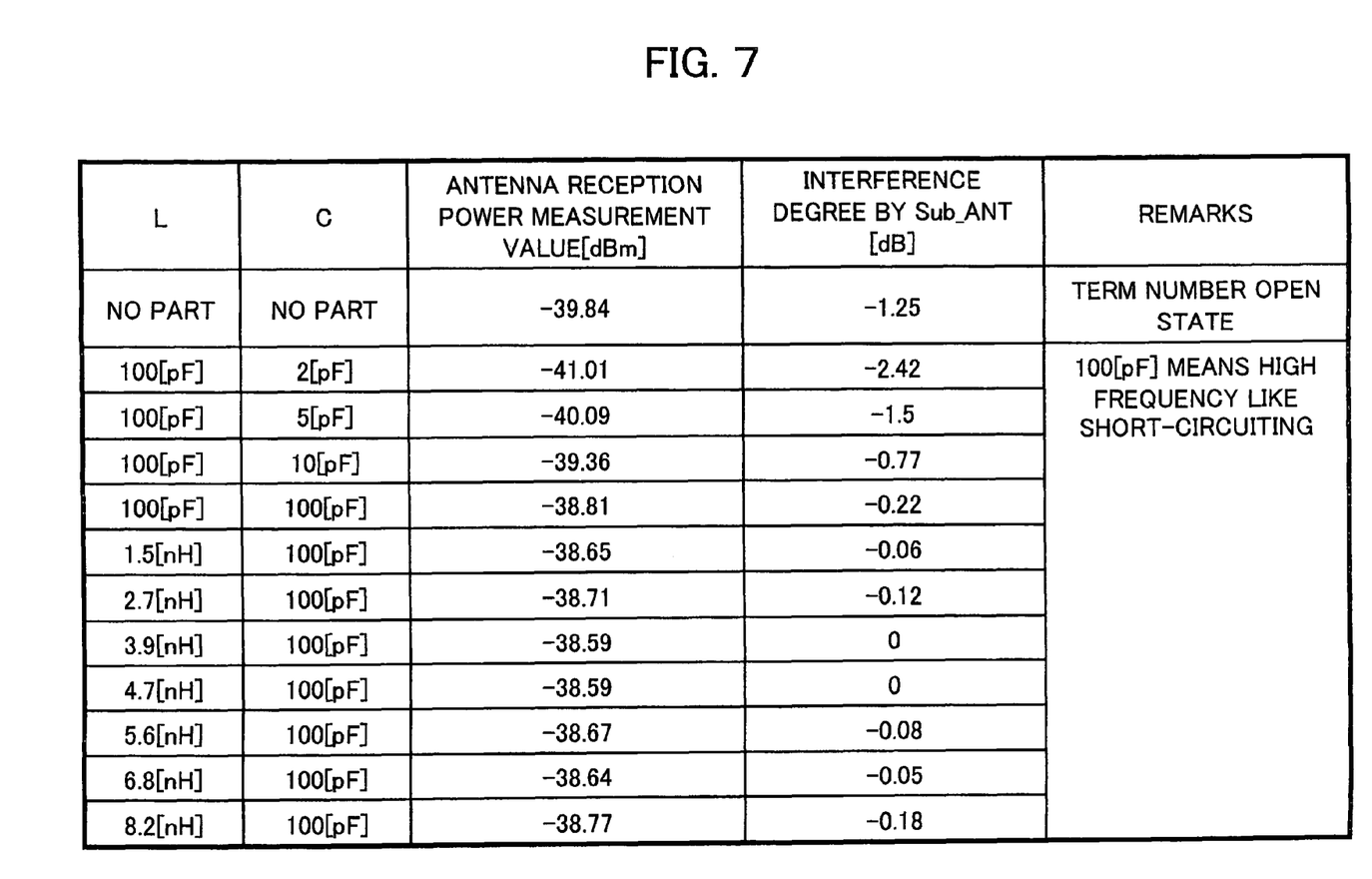
FIG. 7 is a table showing confirmation data of the change in characteristics of the main antenna according to a term constant.

Note that, in the measurement environment as shown in FIG. 6, a change of the characteristic data of the main antenna 111 according to the term constant was confirmed. The data is shown in FIG. 7.

In this measurement system, the transmission was carried out with a constant power from a log periodic antenna 21. The power received by the antenna of the mobile terminal 22 at that time was measured by a spectral analyzer 23 so as to measure the antenna performance. In this case, the higher the measurement value, the better the antenna performance.

Specifically, the characteristic of the main antenna was measured while changing the constant of the sub antenna term circuit, and the influence (interference) by the sub antenna was confirmed by that.

The measurement was carried out at an intermediate frequency of the reception band, that is, 851 MHz.

Note that the antenna reception power where the sub antenna was not mounted was −38.59 dBm. This value is the value in the state where no interference occurs and is defined as the reference value.

In the state assuming the EVDO mode (the sub antenna is terminated at 50 ohms), the antenna reception power is −39.67 dBm. When a value less than this, the term processing may conversely degrade the main antenna characteristic.

In FIG. 7, the interference degree (dB) by the sub antenna is a value obtained by subtracting the reference value (−38.59) from the measurement value of the antenna reception power.

Usually the EVDO system is used only at the time of data reception. This is used only in a downlink. The 1x system is employed for an uplink. Further, usually, the standby state is by the 1x or IS95.

The EVDO is designated after the start of the reception of data and only when in the EVDO zone. It is only here that the sub antenna is used. Then, when the data finishes being acquired and communication is terminated, the standby mode is returned to.

Here, when the EVDO is designated as the data system for use by the network, the impedance may be matched so that the sub antenna can be used as well. Then, when the communication is terminated or switching to communication by the 1x or IS95 system is instructed, the impedance of the sub antenna can be shifted.

With this, the sub antenna is not used at the standby state, therefore a drop in the performance of the main antenna due to the sub antenna can be prevented and the reception performance is improved, so the hand-offs for maintaining the best signal reception state can be reduced, and the power consumption can be reduced. Further, wasted power consumption for an unused antenna is naturally eliminated.

Further, the EVDO becomes used only at the time of the data transfer. If looking closer at that control, TDMA like control (assignment of communication slots for individual terminals in time division manner) is carried out for EVDO.

Therefore, by shifting or separating the impedance of the sub antenna at other than the reception slot on the terminal side, it is possible to prevent adverse influence upon uplink communication.

When performing this control, the number of frames of data received by one reception turn is determined from the modulation method and error rate and the amount of data in accordance with the present state of the radio wave and transmitted by the uplink to the base station. Further, the number of the reception slots is specified associated with this. The data starts to be received from the base station after ½ slot from the transmission to this base station. When the frames to be received end, the non-reception slots start. After this, the processing for starting the reception slots after transmitting the information for the reception from the terminal side to the base station is repeated until the end of the EVDO communication. Here, a configuration in that the sub antenna can be used only at the time of the reception slots can also be considered.

Due to this, the radio wave characteristics of the main antenna used for the uplink other than at the non-reception slots are improved, and, the power consumption can be suppressed.

While the invention has been described with reference to specific embodiments chosen for purpose of illustration, it should be apparent that numerous modification could be made thereto by those techniques in the art without departing from the basic concept and scope of the invention.

What we claim is:

1. A wireless communication terminal for selectively communicating by a first transmission system with only a main antenna or a second transmission system with both the main antenna and a sub antenna comprising:
   a main antenna,
   a sub antenna with a changeable impedance,
   a receiver circuit, wherein the receiver circuit is connected to the sub antenna and configured for changing the impedance, and
   a signal processing unit configured for selecting the first transmission system communicating by a first frequency band using only the main antenna or the second transmission system communicating by a second frequency band using both the main antenna and the sub antenna, wherein the second frequency band interferes with the first frequency band,
   wherein the impedance of the sub antenna is a first value that matches the second frequency band when the second transmission system is selected with the sub antenna used for communicating and the impedance of the sub antenna is a second value when the first transmission system is selected with the sub antenna not used for communicating, wherein the sub antenna with the second value interferes less with the main antenna than the sub antenna with the first value.

2. A wireless communication terminal as set forth in claim 1, further comprising a transmission unit for transmission by the first transmission system between the main antenna and the signal processing unit.

3. A wireless communication terminal as set forth in claim 1, wherein the terminal comprises a switch between the sub antenna and a reception unit, and
   the signal processing unit separates the sub antenna from the reception unit by the switch when the first transmission system is used for communication.

4. A wireless communication terminal as set forth in claim 1, wherein the signal processing unit changes the impedance of the sub antenna to a value different from the first impedance even in a standby state.

5. A wireless communication terminal able to selectively communicate by a first transmission system without use of a diversity method and a second transmission system with use of a diversity method and having a reception function of a frequency band where the frequency bands of the transmission systems interfere with each other, comprising:
 a main antenna,
 a sub antenna, and
 a signal processing unit,
 wherein the signal processing unit communicates by only the main antenna when the first transmission system is used for communication and combines the signals received by the main antenna and sub antenna when the second transmission system is used for communication and
 makes an impedance from a reception unit to the sub antenna a first impedance able to be matched with in the frequency band used when the second transmission system is used for communication and changes the impedance to a value different from the first impedance when the first transmission system is used for communication,
 wherein the signal processing unit specifies a reception slot or a non-reception slot of its own terminal at the time of reception along with the second transmission system by communication with the base station, and, even during communication by the second transmission system, changes the impedance of the sub antenna to a value different from the first impedance in a non-reception slot.

6. A wireless communication terminal for selectively communicating by a first transmission system with a only a main antenna or a second transmission system with both the main antenna and a sub antenna comprising:
 a main antenna;
 a sub antenna with a changeable impedance;
 an impedance control unit, wherein the impedance control unit is connected to the sub antenna and configured for changing the impedance; and
 a signal processing unit configured for selecting the first transmission system communicating by a first frequency band using only the main antenna or the second transmission system communicating by a second frequency band using both the main antenna and the sub antenna, wherein the second frequency band interferes with the first frequency band,
 wherein the impedance of the sub antenna is a first value that matches the second frequency band when the second transmission system is selected with the sub antenna used for communicating and the impedance of the sub antenna is a second value when the first transmission system is selected with the sub antenna not used for communicating,
 wherein the sub antenna with the second value interferes less with the main antenna than the sub antenna with the first value,
 wherein the impedance control unit is connected to the sub antenna both when the first transmission system is selected and when the second transmission system is selected, and
 wherein the impedance control unit changes the impedance of the sub antenna so that the impedance of the sub antenna is the first value when the second transmission system is selected and the impedance of the sub antenna is the second value when the first transmission system is selected.

7. The wireless communication terminal according to claim 6, further comprising a first receiver circuit configured for receiving a signal by the first antenna and a second receiver circuit configured for receiving a signal by the sub antenna, wherein the second receiving circuit comprises the impedance control unit.

\* \* \* \* \*